United States Patent [19]
Nerone

[11] Patent Number: 5,381,076
[45] Date of Patent: Jan. 10, 1995

[54] METAL HALIDE ELECTRONIC BALLAST

[75] Inventor: Louis R. Nerone, Brecksville, Ohio

[73] Assignee: General Electric Company, Schenectady, N.Y.

[21] Appl. No.: 136,840

[22] Filed: Oct. 18, 1993

[51] Int. Cl.$^6$ ............................................. H05B 37/02
[52] U.S. Cl. ................... 315/209 R; 315/307; 315/308; 315/291; 315/DIG. 5; 315/DIG. 7
[58] Field of Search ............... 315/209 R, 307, 308, 315/291, DIG. 4, DIG. 7, DIG. 5, 244

[56] References Cited

U.S. PATENT DOCUMENTS

| | | | |
|---|---|---|---|
| 4,749,913 | 6/1988 | Stuermer et al. | 315/175 |
| 4,904,907 | 2/1990 | Allison et al. | 315/307 |
| 4,928,038 | 5/1990 | Nerone | 315/209 R |
| 5,083,065 | 1/1992 | Sakata et al. | 315/209 R X |
| 5,111,118 | 5/1992 | Fellows et al. | 315/307 |
| 5,134,345 | 7/1992 | El-Hamansy et al. | 315/307 X |

Primary Examiner—Robert J. Pascal
Assistant Examiner—Reginald A. Ratliff
Attorney, Agent, or Firm—George E. Hawranko; Stanley C. Corwin

[57] ABSTRACT

An electronic ballast can be connected between either a DC power supply or an AC power supply and a gas discharge lamp, such as a metal halide lamp and control the electrical power supplied thereto. An inverter receives a DC power and generates a periodic waveform at a controlled frequency. A resonant circuit is connected to the inverter and tuned to resonate at a predetermined frequency and generate an output voltage. A coupling capacitor is connected between the resonant circuit and the discharge lamp and supplies the output voltage of the resonant circuit thereto. A controller sets the frequency of operation of the inverter near the resonant frequency of the resonant circuit. The controller is responsive to at least a predetermined set point control voltage and to the output voltage of the resonant circuit. The resonant circuit is tuned to increase the voltage from the inverter means to a level sufficient to cause the discharge lamp to enter a glow mode of operation. The coupling capacitor and resonant circuit have an appropriate impedance to maintain sufficient power flow to the discharge lamp to carry it through the glow mode of operation, into an arc mode of operation and to a steady-state mode of operation.

18 Claims, 4 Drawing Sheets

METAL HALIDE ELECTRONIC BALLAST

BACKGROUND OF THE INVENTION

1. Field of the Invention

This invention relates to ballasts which connect a discharge lamp to a power supply and, more particularly, to an electronic ballast for use with a metal halide lamp.

2. Description Of The Prior Art

High intensity discharge lamps operate by heating a contained gas to a sufficient level that it becomes excited and emits photons. In a typical DC lamp arrangement, a quartz arc tube contains a quantity of gas, such as mercury alone or combined with halides of a metal, such as sodium or scandium. A pair of main electrodes are positioned at opposite ends of the quartz arc tube and a starting electrode may be positioned adjacent one of the main electrodes. Unlike incandescent lamps, high intensity discharge lamps do not become immediately operational when connected to a power supply. These discharge lamps pass through several modes of operation before reaching a normal, steady-state mode of operation. When the power supply is initially connected to the discharge lamp, a high starting voltage is applied between the starting electrode and the adjacent main electrode, or between the main electrodes, and begins to charge the gas therein. This period of operation is generally referred to as a glow mode. Once the gas has been sufficiently charged throughout the tube, the gas will break over and a high current arc will form between the main electrodes. The arc quickly settles to a lower current, normal voltage level in which the arc discharge of the lamp generates a desired light output.

It is common to use an electronic or other ballast to control the operation of a discharge lamp. In general, an acceptable ballast must at least limit the power supplied to the lamp, otherwise the lamp would be subject to an ever increasing current which would destroy the lamp. Electronic ballasts for metal halide lamps may include two converters which generate the required initial high voltage to break over the lamp and a compliance voltage to transition the lamp from the glow mode to the arc mode. See, for example, U.S. Pat. No. 4,749,913. Although this arrangement has been shown to be successful, it lacks a systematic approach which can achieve a low cost, high performance design. The electronic ballast shown in U.S. Pat. No. 4,904,907 applies a regulated square wave of current to a metal halide discharge lamp to control its operation. A power control circuit useable with a discharge lamp is shown in U.S. Pat. No. 4,928,038.

Most electronic ballasts also control the lamp current, but this is not considered a compatible means to ballast a high intensity discharge lamp. As the voltage rises in a discharge lamp, the lamp current is constant, and the lamp power will, therefore, increase with age. This power increase has the adverse effect of lowering the lamp life and increasing the possibility of a non-passive lamp failure. A good power factor is not a characteristic of the conversion process of these known types of ballasts. Therefore, an additional converter, or a passive filter network, is required to correct the power factor to industry standards when used with a high intensity discharge lamp. Typical passive component, metal halide ballasts are economical but lack the performance and compactness to extend their application. Their typical electronic counterparts are often expensive and are not designed around a topology which offers the optimal blend of performance, cost and compactness. Many ballast techniques are not readily compatible with AC and DC metal halide lamps.

Therefore, it is an object of the present invention to provide an electronic ballast which is useful in controlling metal halide and other high intensity gas discharge lamps. It is an object to provide such a ballast in a low cost arrangement which does not require multiple converters for its operation. It is also an object to provide such a ballast in an arrangement which is small and lightweight. It is a further object to provide such a ballast in an arrangement which can accurately control the lamp power and render it compatible with various lamps. Finally, it is an object of the present invention to provide a gas discharge lamp ballast which can operate either DC or AC metal halide lamps with minor modifications.

SUMMARY OF THE INVENTION

Therefore, I have developed an electronic ballast which can be connected between either a DC power supply or an AC power supply and a gas discharge lamp, such as a metal halide lamp, and control the electrical power supplied thereto. If the ballast is used with an AC power supply, then the circuit includes rectifying means for converting the AC power supply to a DC power supply. In either version, the circuit includes an inverter means which receives the DC power supply and generates a periodic waveform at a controlled frequency. The ballast also includes a resonant circuit connected to the inverter and tuned to resonate at a predetermined frequency and generate an output voltage. A coupling capacitor is connected between the resonant circuit and the discharge lamp and supplies the output voltage of the resonant circuit thereto. A control means is provided for controlling the frequency of operation of the inverter near the resonant frequency of the resonant circuit. The control means is responsive to at least a predetermined set point control voltage and to the output voltage of the resonant circuit. The resonant circuit is tuned to increase the voltage from the inverter means to a level sufficient to cause the discharge lamp to enter a glow mode of operation. The coupling capacitor and resonant circuit have an appropriate impedance to maintain sufficient power flow to the discharge lamp to carry it through the glow mode of operation, into an arc mode of operation and to a steady-state mode of operation.

If a rectifying means is included, it can be formed of a first rectifier in series with a first low pass filter and, optionally, an electromagnetic interference filter. The ballast can also include a power factor corrector circuit for controlling the power supplied to the inverter. In addition, a current means can be provided for detecting the average current supplied to the inverter and power feedback means responsive to the current means for adjusting the frequency of operation of the controller so that the power supplied to the discharge lamp is maintained at a desired level during the steady-state mode of operation.

The inverter can be formed of a series network of a pair of power MOSFET switches arranged in a half bridge. The controller can include a voltage controlled oscillator having its output coupled to the gates of the power MOSFETS by a coupling transformer. The signals supplied to the gates of the power MOSFETS are separated in phase by about 180°. The resonant circuit can be advantageously formed of a series inductor/capacitor circuit and the voltage across the resonant circuit capacitor is supplied to the discharge lamp through the coupling capacitor.

If the electronic ballast of the present invention is used with a DC discharge lamp, then the ballast should further include a second rectifier in series with a second low pass filter and connected between the coupling capacitor and the discharge lamp.

DESCRIPTION OF THE PREFERRED EMBODIMENTS

Figure 1:
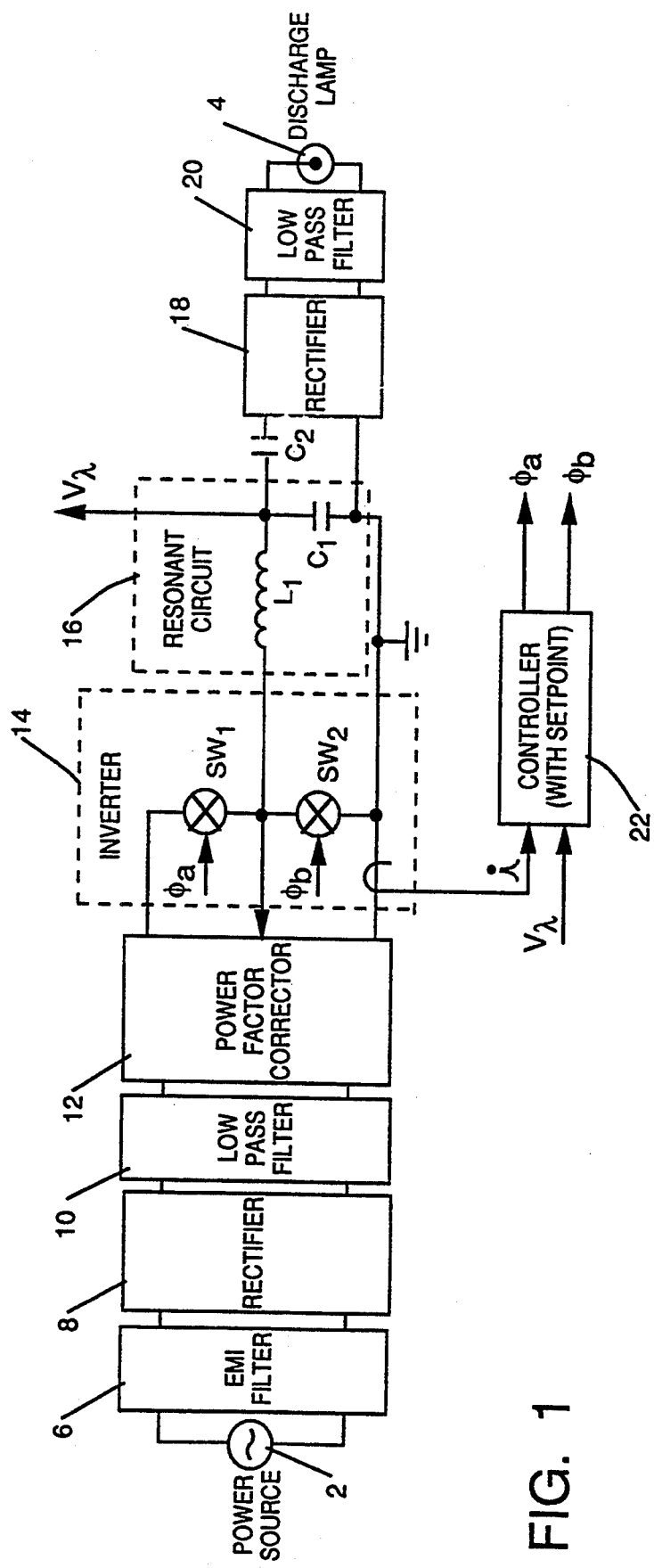
FIG. 1 is a block diagram of one embodiment of an electronic ballast in accordance with the present invention.

An electronic ballast suitable for controlling the supply of electrical power from a power source 2 to a discharge lamp 4, such as a high intensity discharge lamp, particularly a metal halide discharge lamp, is shown in block diagram format in FIG. 1. Although this ballast is shown connected between an AC power source 2 and a DC discharge lamp 4, the same general arrangement can be used with a DC power source and/or an AC discharge lamp with minor modifications as will be discussed hereinafter. Any such arrangement will utilize the main features of the present invention.

The output of the power source 2 is supplied, in turn, to an electromagnetic interference (EMI) filter 6, a first full wave rectifier 8, a first low pass filter 10, and a power factor corrector circuit 12, and then to an inverter 14. The inverter 14 is formed of a pair of controlled, electronic switches $SW_1$ and $SW_2$ which are arranged in a series half bridge arrangement. In other words, switch $SW_1$ conducts when switch $SW_2$ is non-conductive, and vice versa. The voltage across switch $SW_2$ of the inverter 14 is supplied to a resonant circuit 16 formed of inductor $L_1$ in series with capacitor $C_1$. The voltage across capacitor $C_1$ is supplied through a coupling capacitor $C_2$ to, in turn, a second full wave rectifier 18 and second low pass filter 20, and then to the discharge lamp 4. A controller 22 generates control signals $\Phi_a$, $\Phi_b$ which are supplied to switch $SW_1$ and switch $SW_2$, respectively, of the inverter 14. The controller 22 basically establishes the frequency of conduction or operation of the switches $SW_1$ and $SW_2$ in the inverter 14. The controller 22 includes an internal set point and also receives voltage signals related to the average input current to the inverter 14 as well as to the voltage supplied to the discharge lamp 4. As shown in FIG. 1, the lamp voltage $V_\lambda$ is taken across capacitor $C_1$ and supplied to the controller 22. The current to the inverter 14, identified by "i", is converted to a voltage signal which is supplied to the controller 22.

If the electronic ballast shown in FIG. 1 were to be used with a DC power source rather than the AC power source as shown, then power corrector 12, first rectifier 8, and first low pass filter 10 would be eliminated. The power factor corrector 12 is an optional element when used with an AC power source and may be eliminated from the circuit as desired. In such an arrangement, the DC power source would be connected directly to the inverter 14. In addition, if an AC discharge lamp were controlled by the present invention rather than the DC discharge lamp as shown, then the second rectifier 18 would be eliminated.

Figure 2:
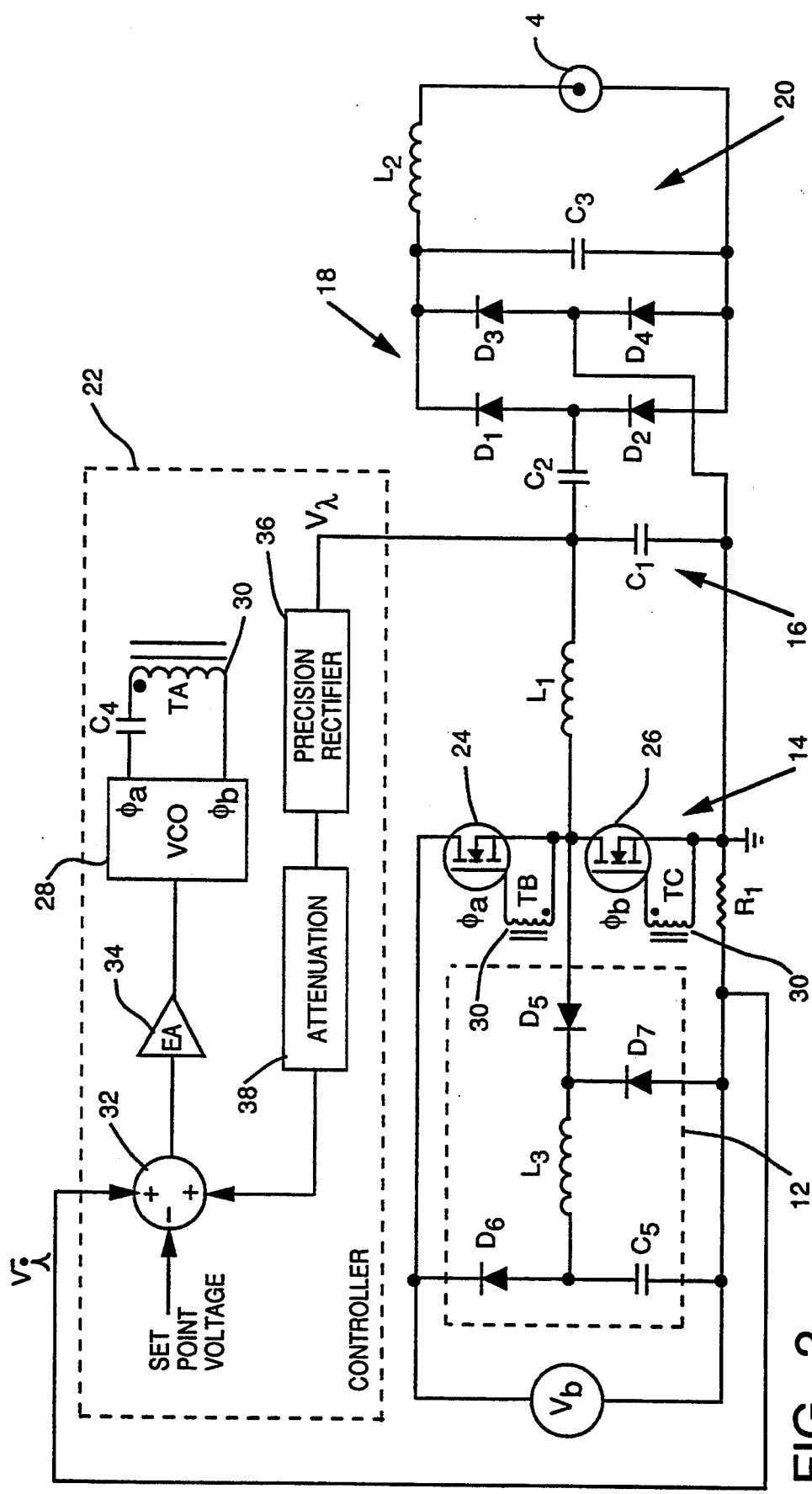
FIG. 2 is a detailed circuit diagram of the electronic ballast shown in FIG. 1.

A more detailed circuit diagram of the electronic ballast shown in FIG. 1 is set forth in FIG. 2. The DC voltage supplied to the inverter 14, whether it is the voltage supplied directly from a DC power source or is the DC linking voltage from an AC power source supplied through the EMI filter 6, first rectifier 8 and first low pass filter 10, is represented as voltage $V_b$ in FIG. 2. The inverter 14 is formed from a pair of power MOSFET devices connected in series. In particular, the inverter 14 has a pair of n channel, enhancement-type power MOSFETS including a first MOSFET 24 and a second MOSFET 26 connected in series, with the drain of the first MOSFET 24 connected to $V_b$, with the source of the first MOSFET 24 connected to the drain of the second MOSFET 26, and with the source of the second MOSFET 26 connected to ground. The resonant circuit 16, formed of inductor $L_1$ and capacitor $C_1$, is connected across the second MOSFET 26. The second rectifier 18 is formed of four diodes, namely, diode $D_1$, diode $D_2$, diode $D_3$ and diode $D_4$, arranged in a standard bridge arrangement. The second low pass filter 20 is formed of inductor $L_2$ and capacitor $C_3$. The power factor corrector 12 is formed of diodes $D_5$, $D_6$ and $D_7$, inductor $L_3$ and capacitor $C_5$.

The heart of the controller 22 shown in FIG. 2 is a voltage controlled oscillator 28 which generates a square wave output signal, represented by control signals $\phi_a$ and $\phi_b$ separated in phase by 180° from each other, and having a frequency determined by an input voltage supplied thereto. The output generated by the voltage controlled oscillator 28 is supplied through capacitor $C_4$ to primary taps TA of a control transformer 30. The gate of the first MOSFET 24 is connected to secondary taps TB of the control transformer 30 and, similarly, the gate of the second MOSFET 26 is connected to secondary taps TC of the control transformer 30. In this manner, control signal $\phi_a$ is supplied to and used to control the operation of the first MOSFET 24 in the inverter 14 and control signal $\Phi_b$ is supplied to and used to control the operation of the second MOSFET 26 in the inverter 14. Within the controller 22, a set point voltage is supplied to a negative input of an adder 32 and the output of the adder 32 is supplied to an error amplifier 34. The output of the error amplifier 34 is supplied directly to the voltage controlled oscillator 28. As is well known in the art, the frequency of operation of the voltage controlled oscillator 28 is determined by the magnitude of the input voltage supplied thereto from the error amplifier 34. The voltage across capacitor $C_1$, which represents the voltage $V_\lambda$ supplied to the discharge lamp 4, is passed through, in turn, a precision rectifier 36 and attenuation element 38 to a positive input of the adder 32. Similarly, the voltage across resistor $R_1$ in the inverter 14, which represents the average input current to the inverter 14, is supplied to another positive input of the adder 32.

Figure 3:
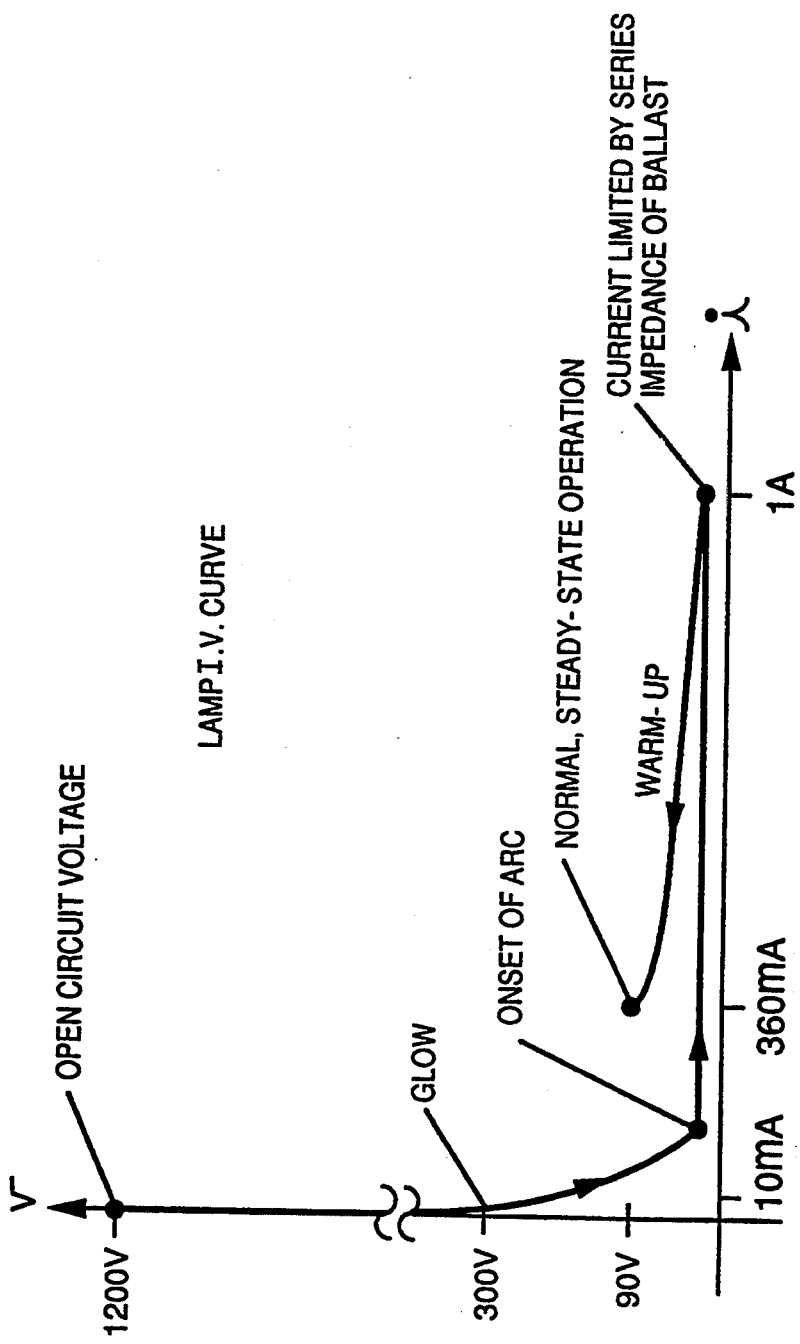
FIG. 3 is a curve showing the relationship of the current and the voltage in the operation of a metal halide lamp from start to a steady-state of operation.
Figure 4:
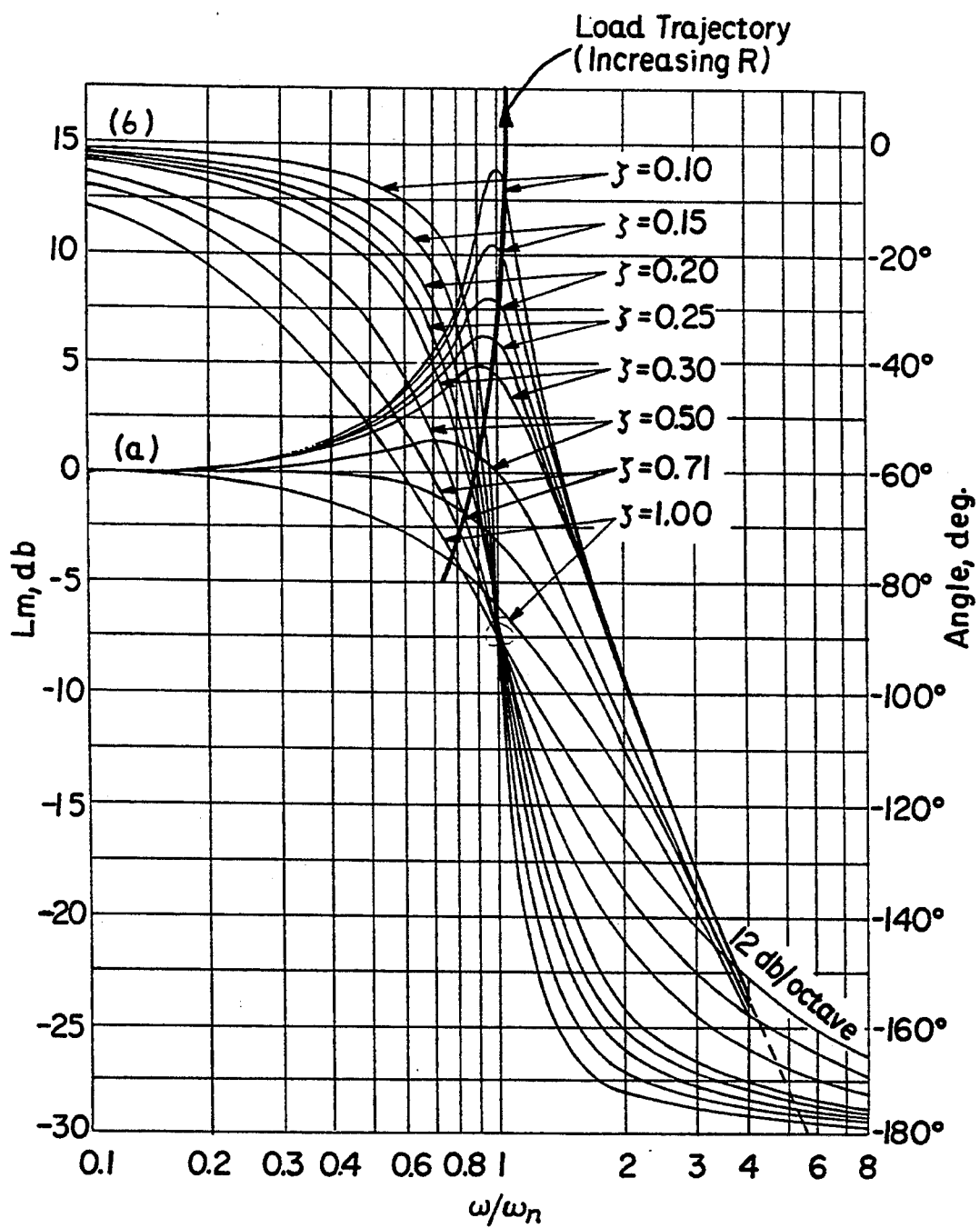
FIG. 4 is a curve showing the magnitude of the voltage across the capacitor and the phase difference between the capacitor and inductor in the resonant circuit in FIGS. 1 and 2 as a function of frequency and damping ratio.

The operation of the electronic ballast shown in FIGS. 1 and 2 above can be explained with continued reference to these Figures as well as to FIGS. 3 and 4. The inverter 14 is the motive force which drives the resonant circuit 16 and the other elements which may be included in the arrangement. The inverter 14 is a simple, series half bridge arrangement of electronic switches whose purpose is to transform the DC linking voltage $V_b$ into a periodic waveform at a desired frequency. The first MOSFET 24 and second MOSFET 26 are alternately gated on and off by the controller 22 in response to set point as modified by the requirements of the lamp load. This alternate gating of the MOSFETS 24 and 26 is provided by the transformer 30 connected between the voltage controlled oscillator 28 and the gates of the MOSFETS 24, 26. This arrangement effectively splits the phase of the output of the voltage controlled oscillator 28. The waveform of the output of the inverter 14 is, to a first approximation, a rectangular waveform. Regardless of the operating mode of the discharge lamp 4, the shape of the waveform generated by the inverter 14 will always be rectangular, although its frequency can vary depending on load conditions and its amplitude can vary depending on the voltage of the power source 2.

In response to the frequency of the signal developed by the inverter 14, the resonant circuit 16, if tuned appropriately, can generate the rather high voltage needed to initiate operation of the discharge lamp 4. This voltage can be as high as 1200 volts or more as shown in FIG. 3. For purposes of analysis, the discharge lamp 4 can be effectively modeled by a variable resistor which has various resistances depending on its mode of operation. These modes of operation, as shown in FIG. 3, are the initial, open circuit voltage mode, the glow mode, the onset of the arc mode and the normal, steady-state mode. When power is initially supplied to the discharge lamp 4, for operation in the open circuit voltage mode and before the discharge lamp has been heated at all and no gas has been charged or ionized, the lamp resistance is extremely high, often greater than 500 k ohms. Effectively, the discharge lamp 4 is an open circuit at this stage. By running the inverter 14 at a frequency near the resonant frequency of the resonant circuit 16, the resonant circuit 16 will develop the extremely high voltage across capacitor $C_1$ needed for the initial operation of the discharge lamp 4. During this initial mode of operation, when the discharge lamp 4 is effectively an open circuit, no current is drawn from capacitor $C_1$ and the coupling capacitor $C_2$ is effectively a short circuit compared to the very high lamp resistance. Therefore, the resonant components of the ballast, ignoring the minor effect of the second rectifier 18 and second low pass filter 20, are simply inductor $L_1$ and capacitor $C_1$. When the resonant circuit 16 is driven near its resonant frequency, under this very high resistive load of the open circuit discharge lamp 4, it can produce a voltage as given by Equation (1) below:

$$V_\lambda = \frac{\frac{2}{\pi} V_b}{\sqrt{(1 - (\omega/\omega_n)^2)^2 + (2\zeta\omega/\omega_n)^2}}$$

where $$\zeta = \frac{1}{2Q} = \frac{\sqrt{LC}}{2R}$$

$R$ = resistance of lamp

-continued $$\omega_n = \frac{1}{\sqrt{LC}}$$

$\omega$ = inverter operating frequency (radians/sec)

$V_b$ = DC linkingvoltage

The inverter radiant frequency $\omega$ can be adjusted to obtain the required starting voltage for any particular discharge lamp 4. This is primarily accomplished by appropriately selecting the set point in the controller 22 and the size of inductor $L_1$ and capacitor $C_1$. Referring also to FIG. 4, it can be seen that the resonant frequency of the resonant circuit 16 is enhanced by maintaining the damping ratio at a low level. In addition, the resonance is enhanced when the phase between the voltage of capacitor $C_1$ and the current through inductor $L_1$, are 90° apart. This phase difference is represented by the right-hand vertical axis in FIG. 4. The left-hand vertical axis of FIG. 4 represents a voltage across capacitor $C_1$ in dB readings. The magnitude of the voltage across $C_1$ is given by the set of curves (a) in FIG. 4 for varying damping ratios of the circuit. Similarly, the phase between the voltage of capacitor $C_1$ and the current through inductor $L_1$ is given by the set of curves (b) in FIG. 4, again for the varying damping ratios. By selecting the damping ratios appropriately, through proper selection of inductor $L_1$ and capacitor $C_1$, the desired resonant characteristics of the circuit can be obtained to generate the desired initial voltage applied to any particular discharge lamp 4.

This high voltage applied to the discharge lamp 4 causes the gas therein to begin to break down. Once the lamp gas breaks down, the discharge lamp 4 enters into the glow mode. At this point, the voltage required by the discharge lamp 4 drops while the current through the discharge lamp 4 increases as the gas begins to be ionized. The resonant circuit 16 becomes loaded in such a way that its voltage drops to about a 300 volt level, without needing to change the frequency of the inverter 14. Equation (1) described above can also be used to establish this relationship because the reactance of capacitor $C_2$ is still much smaller than the equivalent lamp resistance. Once the glow region of operation has been transversed, the discharge lamp 4 will enter the arc mode where an arc is established between the electrodes of the discharge lamp 4. At this point, the currents will quickly increase through the discharge lamp 4 while the voltage remains at a relatively low level. During this stage of operation, the inverter 14 remains at approximately the same frequency, but the voltage across capacitor $C_1$ drops as the load requirements on the discharge lamp 4 change.

Coupling capacitor $C_2$ functions as a DC blocking capacitor and as a series reactance while the discharge lamp 4 is transitioning from the glow mode to the arc mode. As a result, capacitor $C_2$ limits the current which flows through the power MOSFETS 24, 26, by blocking the DC linking voltage $V_b$ from passing into the load, when the equivalent lamp resistance is very low at the onset of the arc mode. This resistance can be as low as 15 ohms at the beginning of the arc mode and increase to about 300 ohms in the steady-state run mode. This is shown clearly in FIG. 3. From this diagram, the equivalent load resistance, as seen by the resonant circuit 16, can be calculated by taking dV/dI in the FIG. 3 plot. The discharge lamp 4 resistance changes rather drastically. Since the discharge lamp resistance does change so drastically from breakdown to the arc mode, capacitor $C_2$ also serves to reduce the loading effect of the resonant circuit 16 by reducing the change in the damping ratio. If there were too much of a change in damping ratio by the effect of $C_2$, this would cause the lamp voltage to rise too rapidly while warming up in the arc mode and cause the lamp to extinguish. Thus, capacitor $C_2$ makes the equivalent lamp resistance a function of frequency as shown in the following equations (assuming $C_1 = C_2$):

$$C_{EQ} = \frac{C_1(R_\lambda \omega C_1)^2 + 2}{(R_\lambda \omega C_1)^2 + 1} \quad \text{(Equation 2)}$$

$$R_{EQ} = \frac{(R_\lambda \omega C_1)^2 + 1}{R_\lambda (\omega C_1)^2} \quad \text{(Equation 3)}$$

where $R_\lambda = R_L$ for AC lamps $R_\lambda = \frac{\pi^2}{8} R_L$ for DC lamps $R_L =$ Actual lamp resistance The impedance matching of the $L_1$, $C_1$ and $C_2$ circuit to the lamp in the transition mode is an important feature of the present invention. Using equations 1, 2 and 3 above, and the known characteristics of a particular discharge lamp and power supply, the size of inductor $L_1$ and capacitor $C_1$ and $C_2$ and frequency of operation of the inverter 14 can be readily determined.

The current through the discharge lamp 4 is limited by the series impedance of the ballast. The current of the lamp then drops, while the voltage rises, and the discharge lamp 4 soon reaches its normal, steady-state operation point. As shown in FIG. 3, this is at about 360 mA and 90 volts for a 32 watt metal halide lamp.

Referring once again to FIGS. 1 and 2, it can be seen that the voltage signal $V_\lambda$ across capacitor $C_1$, which is supplied to the controller 22, functions to keep the voltage from exceeding a certain level. Therefore, this feedback signal makes sure that the desired set point voltage is never exceeded. Once the discharge lamp 4 reaches its normal, steady-state operation, the controller 22 will operate to maintain a constant power level to the lamp 4. This is accomplished by detecting the average input current to the inverter 14, the voltage across resistor $R_1$, and adjusting the set point voltage appropriately to control the frequency of operation of the voltage controlled oscillator 28 and, hence, of the inverter circuit 14.

If a DC discharge lamp 4 is used, then the AC voltage produced at the output of the resonant circuit 16 must be converted to a DC voltage. The AC voltage generated by the inverter 14 and the resonant circuit 16 is rectified by the second bridge rectifier 18 and filtered by the second low pass filter 20. In this arrangement, capacitor $C_3$ is a dominant filtering component when the output voltage is very high, such as at start-up, and inductor $L_2$ is a dominant filtering component when the output current is high, such as in the arc mode. The frequency which must be attenuated by the second low pass filter 20 is twice the inverter frequency, as the result of the second rectifier 18. The lamp ripple current should be kept below about 2% in the run mode to avoid acoustic resonant effects in the lamp.

Once the discharge lamp 4 has reached a steady state of operation, then the power factor corrector circuit 12 can be used to achieve good power factor correction. The inverter 14 is used to drive a passive network including inductor $L_3$, capacitor $C_5$, and diodes $D_5$, $D_6$, and $D_7$. Since the inverter 14 is always operating at a 50% duty ratio, i.e., each MOSFET 24 and 26 is conducting for exactly one-half the total inverter frequency, the power factor corrector circuit 12 operates as a discontinuous forward converter. Assuming steady-state conditions and with MOSFET 24 conducting, diode $D_5$ conducts whenever the power line voltage is greater than the voltage across capacitor $C_5$. Therefore, capacitor $C_5$ is charging whenever MOSFET 24 is conducting. Inductor $L_3$ limits the current applied to capacitor $C_5$. Diode $D_6$ conducts whenever the rectified power line voltage is less than the voltage that capacitor $C_5$ reaches during its charging interval, thus supplying continuous power to the inverter 14.

In addition to the circuits described above, the present electronic ballast can also use a phase lock loop controller to increase performance. The phase of this phase lock loop controller would be initially set at zero. Then the current supplied to inductor $L_1$ is determined and compared to the actual voltage generated by the MOSFETS 24 and 26 using control signals $\phi_a$ or $\phi_b$. Then the voltage controlled oscillator 28 is set such that the phase of the current in inductor $L_1$ and the control signal $\phi_a$ or $\phi_b$ are kept the same.

Having described above the presently preferred embodiments of the present invention, it is to be understood that the invention may be otherwise embodied within the scope of the appended claims.

I claim:

1. An electronic ballast which can be connected between a DC power supply and a gas discharge lamp and control the electrical power supplied to said gas discharge lamp, said electronic ballast comprising:
   a. an inverter circuit receptive of a DC signal from said power supply and effective so as to generate a periodic waveform at a controlled frequency;
   b. a resonant circuit connected to said inverter circuit and tuned to resonate at a predetermined frequency and generate an output voltage;
   c. a coupling capacitor connected between said resonant circuit and said discharge lamp and effective so as to supply said resonant circuit output voltage to said discharge lamp; and
   d. a control circuit arrangement connected to said inverter circuit and effective so as to control said inverter circuit to a frequency of operation near the resonant frequency of said resonant circuit, wherein said control circuit arrangement is responsive to at least a predetermined setpoint control voltage and to the output voltage of said resonant circuit, with the resonant circuit tuned to increase the voltage from the inverter circuit to a level sufficient to cause the discharge lamp to enter a glow mode of operation, and with the coupling capacitor and resonant circuit having an appropriate impedance to maintain sufficient power flow to the discharge lamp to carry it through the glow mode of operation, into an arc mode of operation and to a steady-state mode of operation.

2. The electronic ballast of claim 1 further including a power factor corrector circuit means for controlling the power supplied to said inverter.

3. The electronic ballast of claim 1 further including a current sensing circuit effective so as to detect the average current supplied to said inverter, and a power feedback circuit responsive to said current sensing circuit, said power feedback circuit being effective so as to adjust the frequency of operation of said control circuit arrangement so that the power supplied to said discharge lamp is maintained at a desired level during the steady-state mode of operation.

4. The electronic ballast of claim 1 wherein said inverter is formed of a series network of a pair of power MOSFET switches.

5. The electronic ballast of claim 4 wherein said control circuit arrangement includes a voltage controlled oscillator having its output coupled to gates of said power MOSFETS by a coupling transformer, with the signals supplied to the gate of each of said power MOSFETS separated in phase by about 180°.

6. The electronic ballast of claim 5 wherein said resonant circuit is formed of a series inductor/capacitor circuit and the voltage across said resonant circuit capacitor is supplied to said discharge lamp through said coupling capacitor.

7. The electronic ballast of claim 1 further including a rectifier in series with a low pass filter and connected between said coupling capacitor and the discharge lamp.

8. The electronic ballast of claim 1 wherein said discharge lamp is a metal halide discharge lamp.

9. An electronic ballast which can be connected between an AC power supply and a gas discharge lamp and control the electrical power supplied to said gas discharge lamp, said electronic ballast comprising:
   a. a rectifier circuit effective so as to convert said AC power supply to a DC power supply;
   b. an inverter circuit receptive of a DC signal from said rectifier circuit, said inverter circuit being effective so as to generate a periodic waveform at a controlled frequency;
   c. a resonant circuit connected to said inverter circuit and tuned to resonate at a predetermined frequency and generate an output voltage;
   d. a coupling capacitor connected between said resonant circuit and said discharge lamp and supplying said resonant circuit output voltage to said discharge lamp; and
   e. a control circuit arrangement connected to said inverter and being effective so as to control said inverter circuit to a frequency of operation near the resonant frequency of said resonant circuit, with the control circuit arrangement responsive to at least a predetermined set point control voltage and to the output voltage of said resonant circuit, with the resonant circuit tuned to increase the voltage from the inverter circuit to a level sufficient to cause the discharge lamp to enter a glow mode of operation, and with the coupling capacitor and resonant circuit having an appropriate impedance to maintain sufficient power flow to the discharge lamp to carry it through the glow mode of operation, into an arc mode of operation and to a steady-state mode of operation.

10. The electronic ballast of claim 9 wherein said rectifier circuit includes a first rectifier in series with a first low pass filter.

11. The electronic ballast of claim 10 wherein said rectifier circuit further includes an electromagnetic interference filter.

12. The electronic ballast of claim 9 further including a power factor corrector circuit for controlling the power supplied to said inverter.

13. The electronic ballast of claim 9 further including a current sensing circuit effective so as to detect the average current supplied to said inverter, and a power feedback circuit responsive to said power sensing circuit, said power feedback circuit being effective so as to adjust the frequency of operation of said controller so that the power supplied to said discharge lamp is maintained at a desired level during the steady-state mode of operation.

14. The electronic ballast of claim 9 wherein said inverter is formed of a series network of a pair of power MOSFET switches.

15. The electronic ballast of claim 14 wherein said control circuit arrangement includes a voltage controlled oscillator having its output coupled to gates of said power MOSFETS by a coupling transformer, with the signals supplied to the gate of each of said power MOSFETS separated in phase by about 180°.

16. The electronic ballast of claim 15 wherein said resonant circuit is formed of a series inductor/capacitor circuit and the voltage across said resonant circuit capacitor is supplied to said discharge lamp through said coupling capacitor.

17. The electronic ballast of claim 9 further including a second rectifier in series with a second low pass filter and connected between said coupling capacitor and the discharge lamp.

18. The electronic ballast of claim 9 wherein said discharge lamp is a metal halide discharge lamp.

* * * * *